(12) United States Patent
McMahon et al.

(10) Patent No.: US 11,492,948 B2
(45) Date of Patent: Nov. 8, 2022

(54) DIESEL EXHAUST FLUID (DEF) MODULE COVER AND SENSOR ASSEMBLY

(71) Applicant: RB Distribution, Inc., Colmar, PA (US)

(72) Inventors: James K. McMahon, Telford, PA (US); James J. Rivera, Allentown, PA (US); Stephen C. Trance, Jupiter, FL (US); Todd M. Wilson, Jupiter, FL (US)

(73) Assignee: RB DISTRIBUTION, INC., Colmar, PA (US)

( * ) Notice: Subject to any disclaimer, the term of this patent is extended or adjusted under 35 U.S.C. 154(b) by 0 days.

(21) Appl. No.: 17/206,834

(22) Filed: Mar. 19, 2021

(65) Prior Publication Data

US 2022/0298950 A1   Sep. 22, 2022

(51) Int. Cl.
| | |
|---|---|
| *F01N 3/28* | (2006.01) |
| *F01N 13/00* | (2010.01) |
| *F01N 13/18* | (2010.01) |
| *F01N 13/08* | (2010.01) |
| *F01N 3/20* | (2006.01) |
| *B29C 65/08* | (2006.01) |

(52) U.S. Cl.
CPC ........... *F01N 3/2896* (2013.01); *B29C 65/08* (2013.01); *F01N 3/2066* (2013.01); *F01N 13/008* (2013.01); *F01N 13/085* (2013.01); *F01N 13/1827* (2013.01); *F01N 13/1888* (2013.01); *F01N 2610/02* (2013.01); *F01N 2610/10* (2013.01); *F01N 2610/1406* (2013.01)

(58) Field of Classification Search
CPC .... F01N 3/2896; F01N 3/2066; F01N 13/008; F01N 13/085; F01N 13/1827; F01N 13/1888; F01N 2610/02; F01N 2610/10; F01N 2610/1406; B29C 65/08; G01N 27/4078; G01F 23/242
See application file for complete search history.

(56) References Cited

U.S. PATENT DOCUMENTS

| | | | |
|---|---|---|---|
| 7,836,684 B2 | 11/2010 | Starck et al. | |
| 7,978,965 B2 | 7/2011 | Starck | |
| 8,358,921 B2 | 1/2013 | Haeberer | |
| 8,627,718 B2 | 1/2014 | Ulrich et al. | |
| 9,752,486 B2 * | 9/2017 | Yang ................... | G01F 23/2961 |
| 2006/0015020 A1 * | 1/2006 | Neale .................. | B29C 66/1122 |
| | | | 156/60 |
| 2008/0290184 A1 | 11/2008 | Strizinger et al. | |
| 2011/0011178 A1 * | 1/2011 | Ulrich ................... | G01F 23/242 |
| | | | 73/292 |
| 2011/0155262 A1 * | 6/2011 | Ante ..................... | G01F 23/268 |
| | | | 73/304 C |

FOREIGN PATENT DOCUMENTS

CN          210370865 U       4/2020

* cited by examiner

*Primary Examiner* — Brandon D Lee
(74) *Attorney, Agent, or Firm* — Volpe Koenig (57) ABSTRACT

A cover for a DEF assembly with openings dimensioned to receive various components that are positioned in the DEF holding tank and associated seals for closing the openings and retaining the components is disclosed. The seals are fixed to the cover by a sonic weld.

5 Claims, 9 Drawing Sheets

DIESEL EXHAUST FLUID (DEF) MODULE COVER AND SENSOR ASSEMBLY

FIELD OF INVENTION

This disclosure generally relates to a diesel exhaust fluid (DEF) module.

BACKGROUND

Diesel exhaust fluid (DEF) is used in diesel engines in order to reduce pollution generated by the engine. DEF is typically made of a urea solution and is configured to reduce nitrogen oxides ($NO_x$) into water and nitrogen, which drastically reduces the polluting effect of the engine exhaust.

DEF tanks or modules are separate from other engine components due to urea being corrosive to metal. Additionally, DEF has a freezing point around 12° F. and therefore must be heated in order to ensure that DEF remains liquid and can be pumped from the DEF tank to the exhaust pipeline. One method of ensuring that the DEF is maintained at the proper temperature is to provide a heating element within the DEF tank. Sensor assemblies also monitor the DEF temperature and provide alerts or indications when DEF levels in the tank are low.

Due to these various requirements, it is critical that components or tubing passing thorough the cover are properly and reliably sealed.

SUMMARY

The Applicant has addressed the prior art failings with a DEF module cover assembly with a closure that has more a reliable sealing and an improved sensor assembly.

The closure has a cover portion that is dimensioned to close the DEF holding tank and includes a variety of openings for passing different components through the cover and into the DEF holding tank. A plurality of sealing devices are provided for sealing the openings according to the combination of an opening and a selected component. Each sealing device is fixed to the cover portion by a sonic weld.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
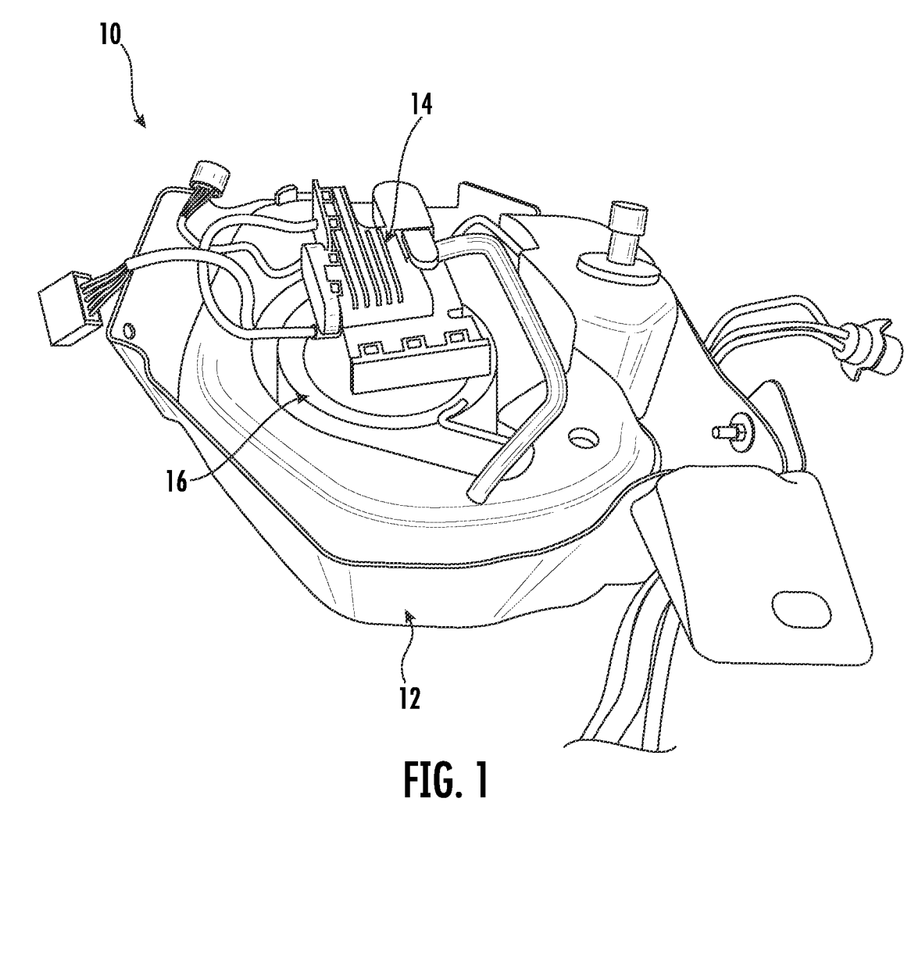
FIG. 1 is a perspective view of a DEF assembly.
Figure 2:
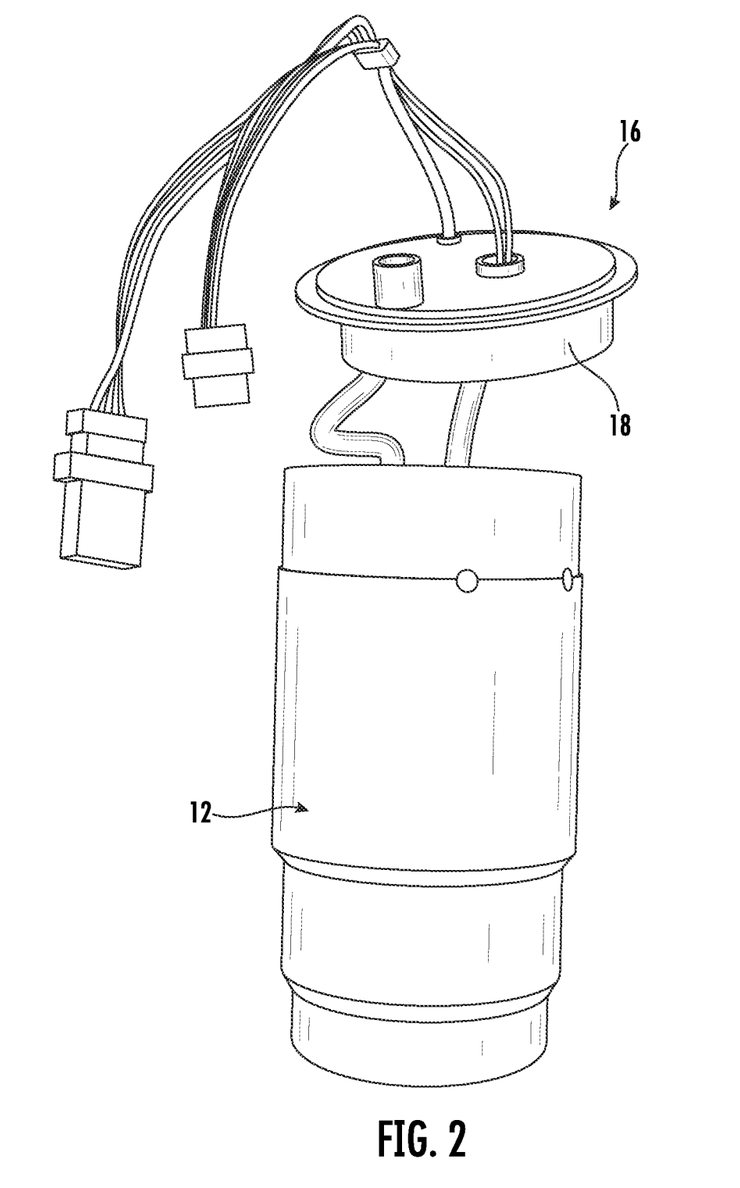
FIG. 2 is a partially assembled view of a module of the DEF assembly.

As shown in FIGS. 1 and 2, the DEF assembly 10 generally includes a DEF holding tank 12, a pump 14, and a cover module or closure 16. The closure 16 includes a cover 18 that forms the top of the tank 12. A pickup tube 20 is arranged within the tank 12 to provide DEF from the tank 12 to the exhaust pipeline via the pump 14.

Figure 3:
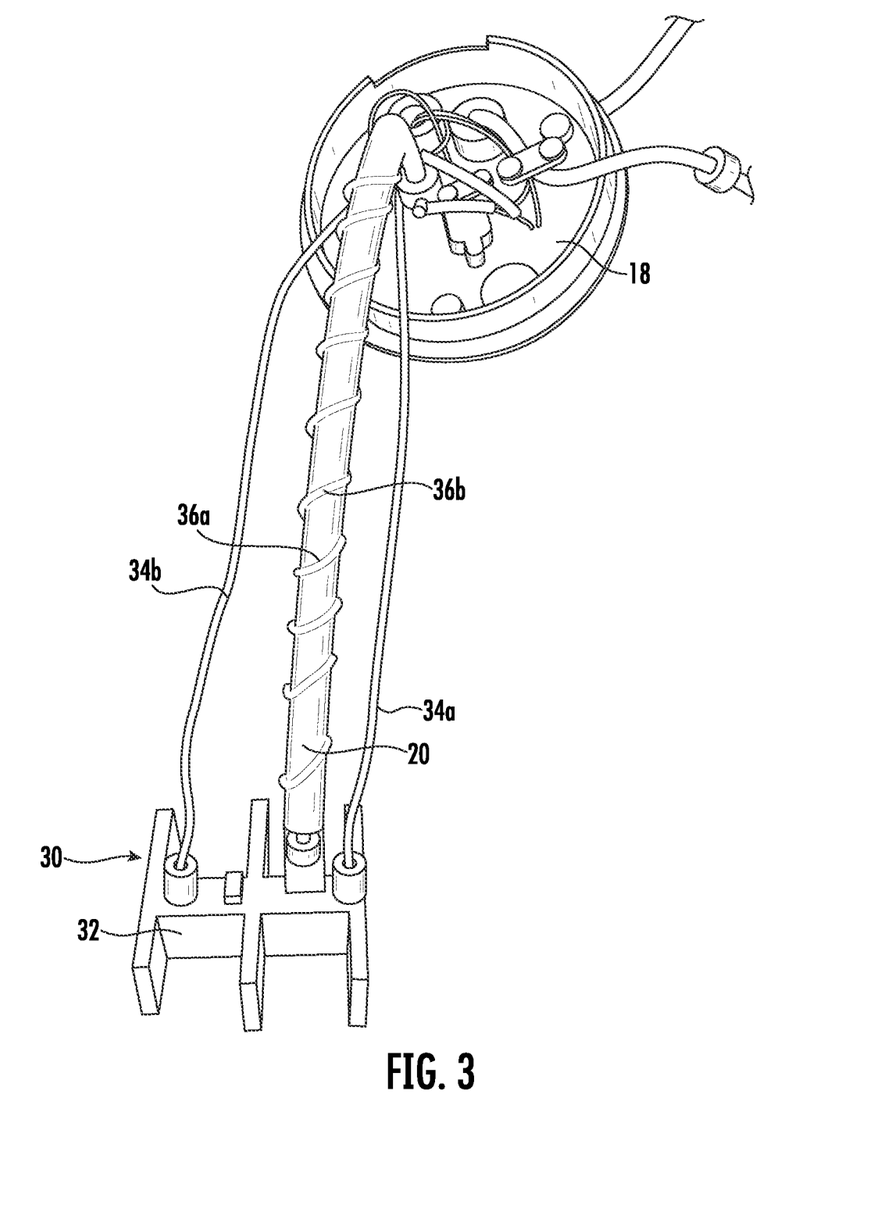
FIG. 3 illustrates a heating assembly attached to a cover of the module.
Figure 4:
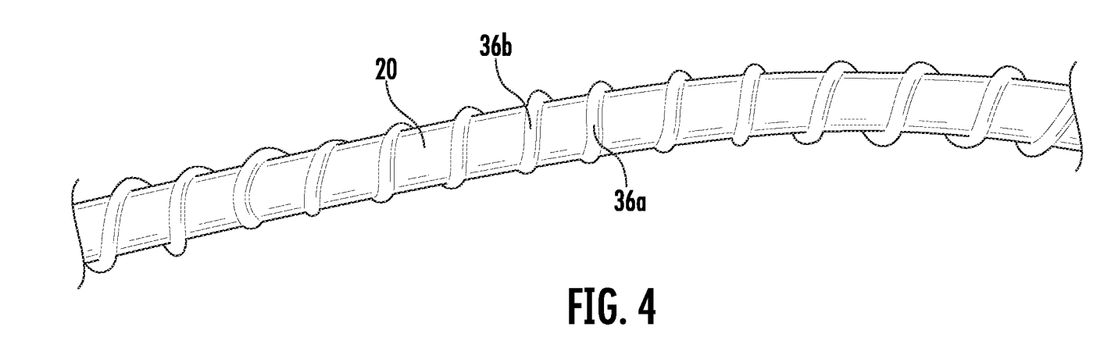
FIG. 4 is a magnified view of a pickup tube of the module.

The DEF closure 16 includes a heating assembly 30 shown in FIG. 3. The heating assembly 30 includes a heating element 32 configured to be submerged in DEF within the tank 12. The heating assembly 30 includes a first set of electrical leads 34a and 34b that are connected to the heating element 32. A second set of electrical leads 36a and 36b, shown in FIGS. 3 and 4, are helically wrapped around the pickup tube 20.

Figure 5:
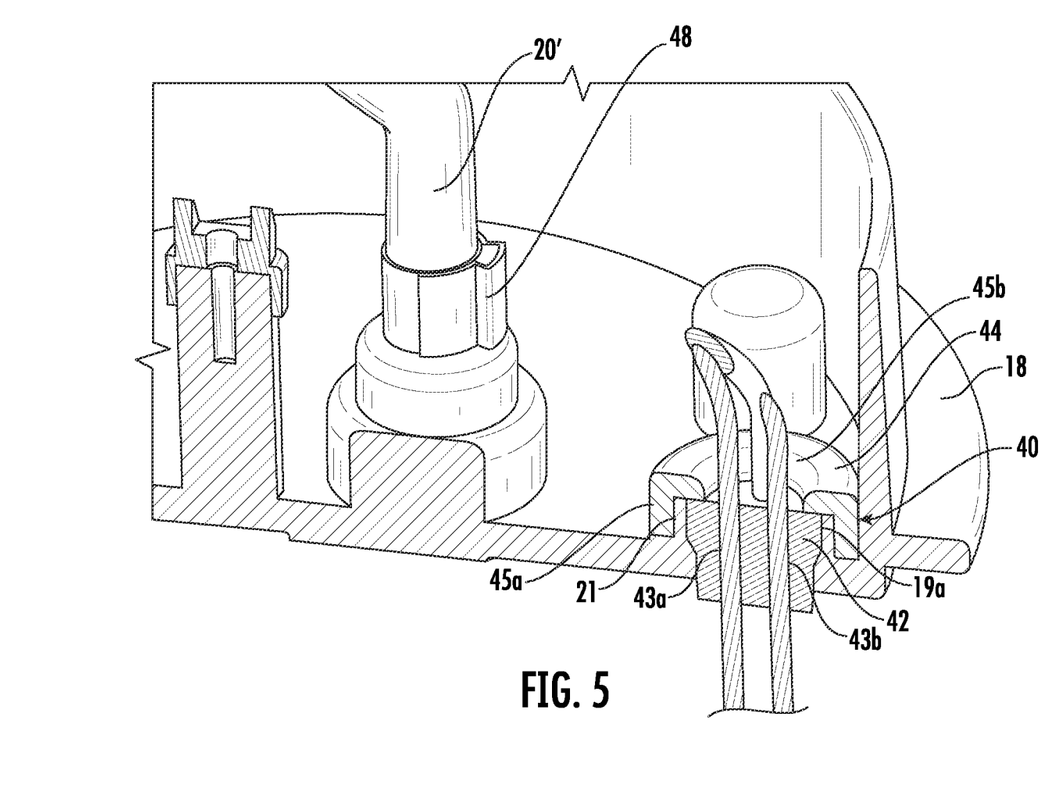
FIG. 5 is a perspective view of the cover of the module taken along a cross-section through an opening defined for passage of electrical wires.
Figure 6:
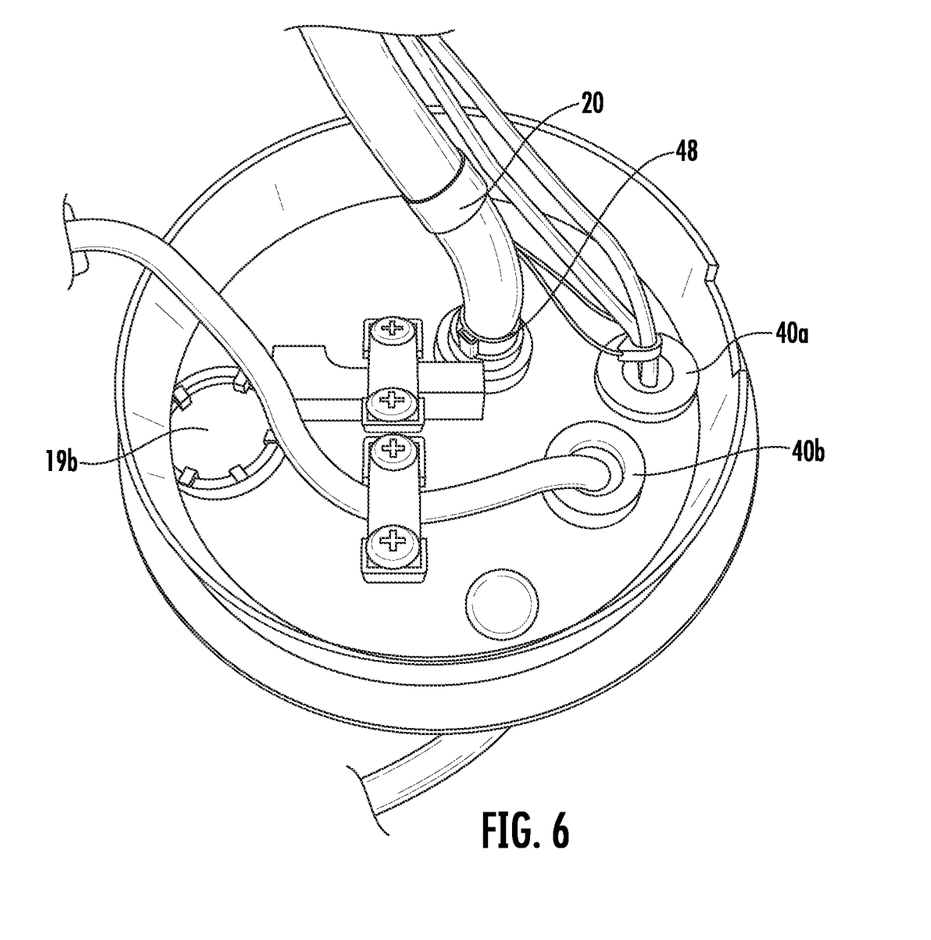
FIG. 6 is another view of the cover of FIG. 5.

As shown in FIGS. 5 and 6, the cover 18 includes a sealing assembly 40 that retains and seals multiple components passing through the cover 18. With reference to FIG. 5, each sealing assembly includes a plug 42 dimensioned for a press-fit into an opening, such as 19a or 19b, in the cover 18. The plug 42 has a radially outer surface with a tapered profile that complements the radially inner surface and taper of the opening 19a. The press-fit engagement between the tapered surfaces of the plug 42 and opening 19a secures the plug 42 relative to the cover 18. The plug 42 may include a plurality of passages 43a 43b that are dimensioned to receive and secure wires, cables, or other components passing through the cover 18. The plug 42 is preferably formed from a material that is compressible, or capable of deformation. Press-fitting the plug 42 into the opening 19a causes the plug 42 to elastically compress or deform to constrict the passages 43a 43b and secure the components within the plug 42. As a result of this press-fit, the need for separate clamping devises for securing a plug 42 to the cover 18 is eliminated.

As shown in FIG. 5, the cover 18 has a shoulder or collar 21 surrounding the opening 19a. In the preferred assembly, the plug 42 is pressed into the opening 19a until the top surface of plug 42 is at least flush with the axial or free end of the collar 21. A sealing cap 44 is positioned over the plug 42 and the collar 21. The sealing cap 44 has lower portion 45a that is dimensioned to surround the collar 21 and an upper portion 45b that extends inwardly toward the center opening to extend over the plug 42. In the preferred embodiment, the sealing cap 44 is fastened to the plug 42 and the cover 18 by sonic welding them together as a unit.

Figure 7:
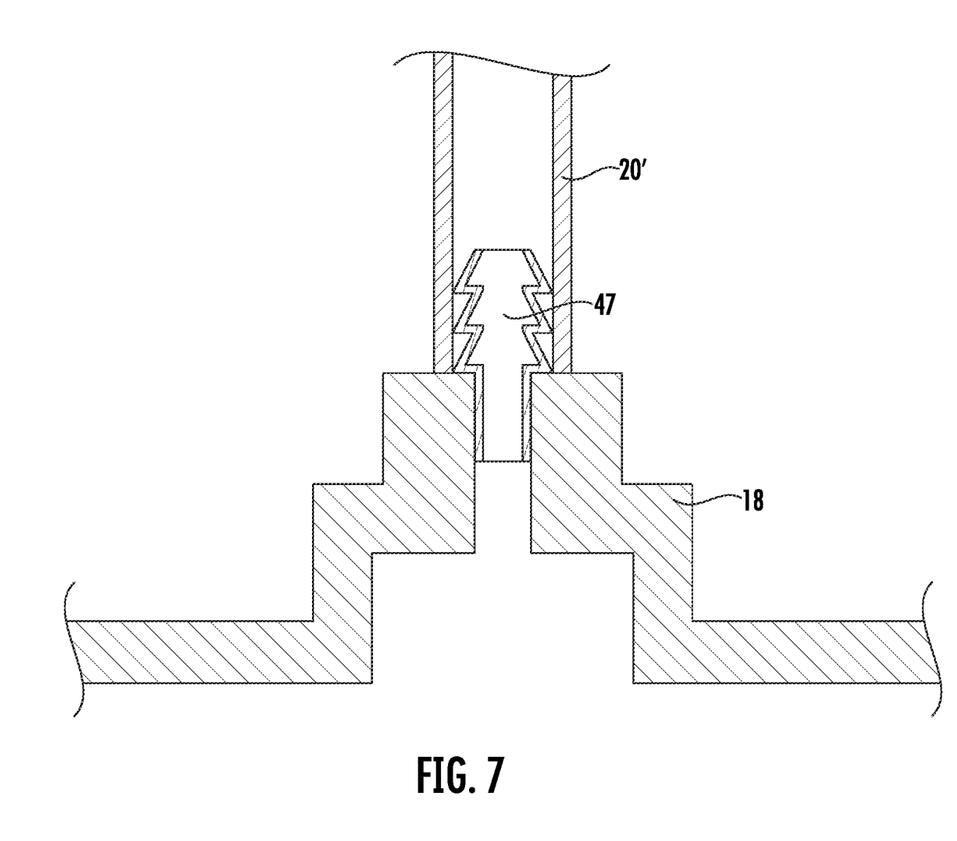
FIG. 7 is a magnified cross-sectional view of the cover in a region of the opening for the pickup tube.

With reference to FIGS. 3 and 5 through 7, a pickup tube hose 20' is secured to the cover 18 via a barbed hose fitting 47 and a metal clamp 48. The barbed hose fitting 47 is illustrated in FIG. 7 without the metal clamp 48. The barbed hose fitting 47 can be attached to the cover 18 by a press-fit, a sonic weld, or a threaded connection. Alternatively, the hose fitting 47 may be molded as part of the cover 18.

As shown in FIGS. 8-12, a sensor assembly 50 is provided for the cover assembly 16. In one aspect, the sensor assembly 50 is configured to both detect a temperature of the DEF and detect a fill level of the DEF within the tank 12. As shown in FIGS. 8-12, the housing 52 of sensor assembly 50 includes at least one sensor 76 that passes through collar 53 defined on a proximal or first end of the sensor housing 52, and extends to base of the tank 12, shown in FIG. 1. A cap 58 closes the distal end 56 of the sensor housing 52. Preferably, the base cap 58 is sonic welded to the housing 52. A temperature sensor element 60, such as a thermistor, is preferably arranged within the sensor housing 52. At least one electrical lead 61 is connected between a power source and the temperature sensor element 60. A thermally conductive potting compound 62 is placed in opening 54 of the housing 52 to set the temperature sensor element 60. The housing 52 includes a shoulder 55 at the end opposite to cap 58 that is dimensioned to protrude through the opening 19b when the housing connected to the cover 18.

Figure 8:
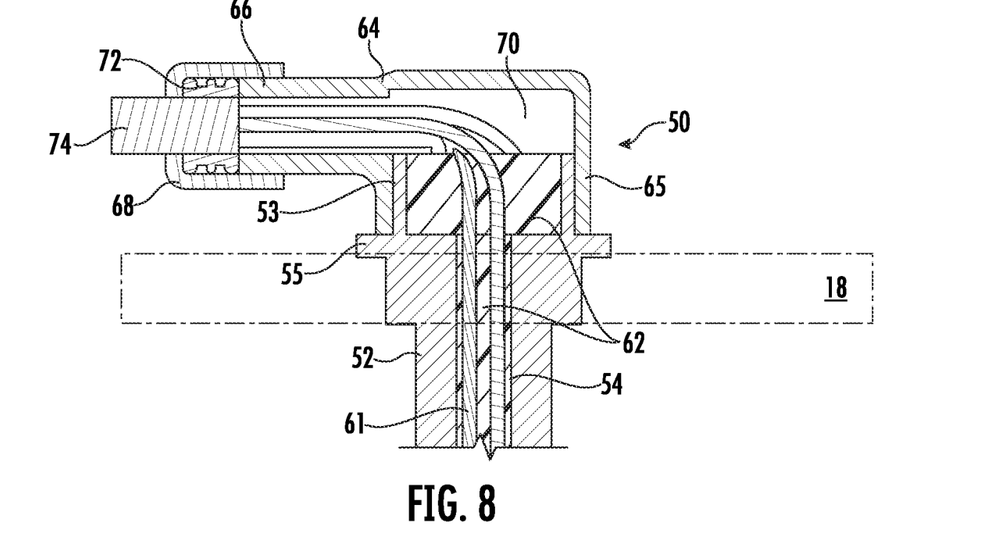
FIG. 8 is a side cross-sectional view of a sensor assembly in an upper region.
Figure 9:
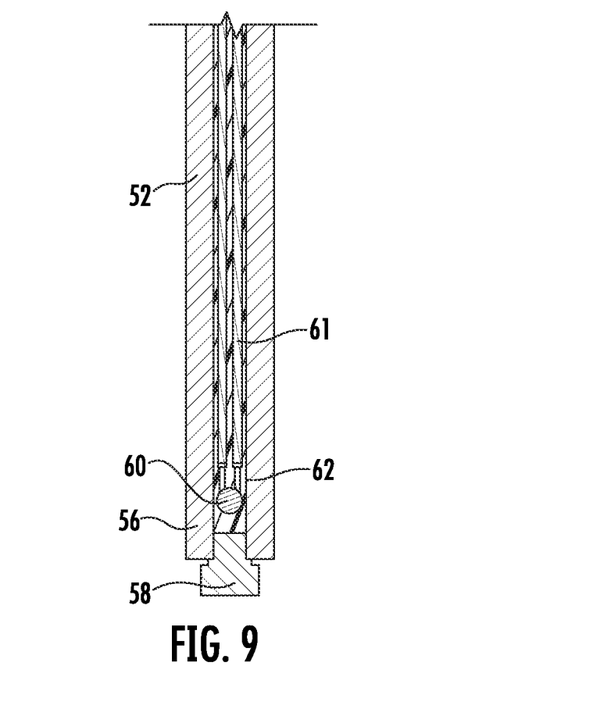
FIG. 9 is a side cross-sectional view of the sensor assembly in a lower region.
Figure 10:
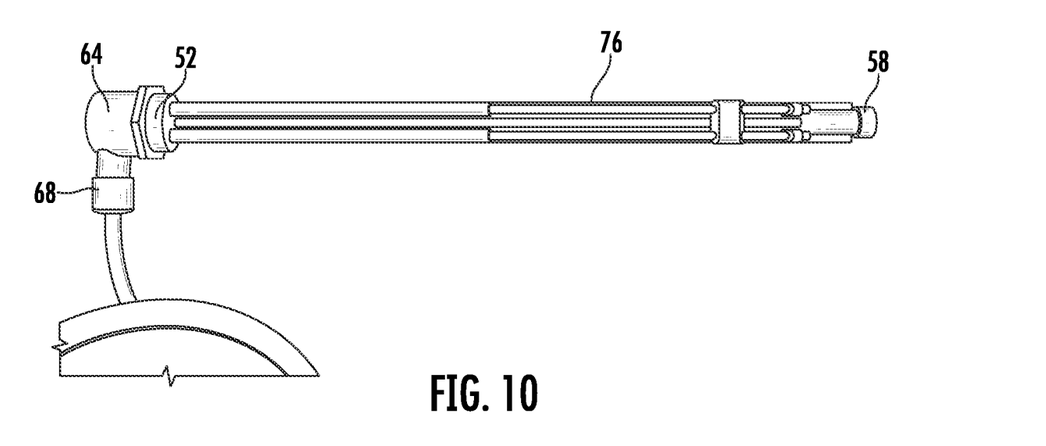
FIG. 10 is a side view of the sensor assembly of FIGS. 8 and 9.
Figure 11:
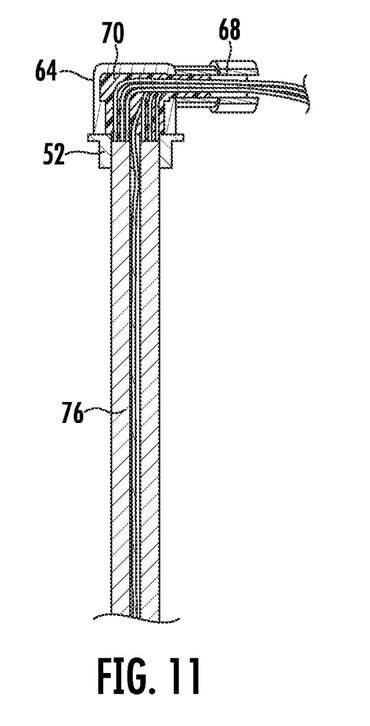
FIG. 11 is a cross-sectional side view of the sensor assembly in the upper region.
Figure 12:
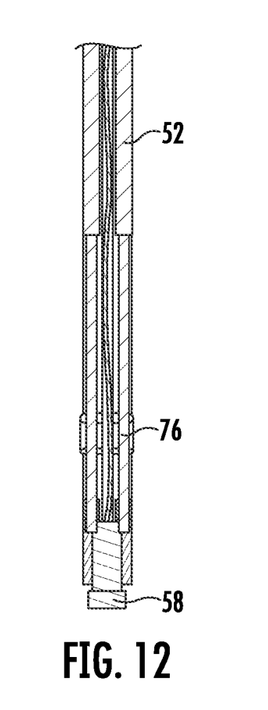
FIG. 12 is an additional cross-sectional side view of the sensor assembly in the lower region.

With reference to FIGS. 8 and 10, the junction housing 64 includes a sleeve 65 that is dimensioned to surround and engage the collar 53 of the sensor housing 52. The sensor housing 52 and the junction housing 64 are preferably fastened to each other by sonic welding. As shown in FIG. 8, the cavity 70 inside the junction housing 64 is filled with the thermally conductive potting compound 62.

A second or free end 66 of junction housing 64 is open as a passage for the electrical lead 61 to extend out to a power source. Depending on the information being collected, multiple electrical conductors or other components can be fed out through the free end 66 of housing 64. The components passing through the free end 66 of the junction housing 64 are typically enclosed in an oil resistant wrapping or tube 74 that passes through a gasket. The free end 66 is closed with a sealing cap 68 that is dimensioned to surround the free end 66. The cap 68 is preferably sonic welded to the free end 66.

What is claimed is:

1. A sensor assembly for a DEF module, the sensor assembly comprising:
   a sensor housing having a central hollow opening that extends through a first end that includes a shoulder with an upstanding collar, and a second end that is closed by a base cap;
   a junction housing having a first end that is sonic welded to the upstanding collar of the sensor housing, and a second end defining an opening for passage of at least one electrical wire;
   a temperature sensor element connected to the at least one electrical wire and arranged in a lower portion of the central hollow opening;
   a thermally conductive potting compound that fills the central hollow opening from the upstanding collar to the base cap and surrounds the temperature sensor element; and
   a sealing cap fastened to the second end of the junction housing that closes the opening and surrounds the at least one electrical wire.

2. The sensor assembly according to claim 1, wherein the sealing cap is sonic welded to the junction housing.

3. The sensor assembly according to claim 1, wherein the thermally conductive potting compound at least partially fills the cavity of the junction housing.

4. The sensor assembly according to claim 1, wherein the base cap is sonic welded to the sensor housing.

5. The sensor assembly according to claim 1, further comprising at least one level sensor element extending through the cavity in the junction housing and towards the second end of the sensor housing.

* * * * *